United States Patent
Tanaka

(10) Patent No.: US 10,834,380 B2
(45) Date of Patent: Nov. 10, 2020

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Yasumi Tanaka, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 37 days.

(21) Appl. No.: 15/550,644

(22) PCT Filed: Feb. 1, 2016

(86) PCT No.: PCT/JP2016/000490
§ 371 (c)(1),
(2) Date: Aug. 11, 2017

(87) PCT Pub. No.: WO2016/132688
PCT Pub. Date: Aug. 25, 2016

(65) Prior Publication Data
US 2018/0041751 A1  Feb. 8, 2018

(30) Foreign Application Priority Data
Feb. 19, 2015  (JP) .................................. 2015-030860

(51) Int. Cl.
*H04N 13/344* (2018.01)
*G06T 19/00* (2011.01)
(Continued)

(52) U.S. Cl.
CPC ......... *H04N 13/344* (2018.05); *G02B 27/017* (2013.01); *G06F 3/011* (2013.01);
(Continued)

(58) Field of Classification Search
CPC ...... G02B 2027/0138; G02B 2027/014; G02B 27/017; G06F 3/011; G06T 19/006;
(Continued)

(56) References Cited

U.S. PATENT DOCUMENTS 5,523,886 A * 6/1996 Johnson-Williams ...................... A63F 13/02
359/464
2010/0091096 A1* 4/2010 Oikawa ................... G06F 3/011
348/53
(Continued)

FOREIGN PATENT DOCUMENTS

EP  2395763 A2  12/2011
JP  7-84326 A  3/1995
(Continued)

OTHER PUBLICATIONS

International Search Report and Written Opinion for PCT/JP2016/000490 and notification of transmittal of the ISR/WO, dated Apr. 25, 2016.
(Continued)

*Primary Examiner* — Farzana Hossain
(74) *Attorney, Agent, or Firm* — Canon U.S.A., Inc. IP Division

(57) ABSTRACT

An information processing apparatus including: an image acquisition unit acquiring a first real image captured by a first image capturing device from a first viewpoint and a second real image captured by a second image capturing device from a second viewpoint; and an output unit outputting, to a first display unit for presenting an image to the user's left eye and to a second display unit for presenting an image to the user's right eye, a synthesized image in which the first real image and a virtual image are synthesized if a first mode is set, outputting, to the first display unit, a synthesized image in which the first real image and a virtual (Continued)

image are synthesized if a second mode is set, and outputting, to the second display unit, a synthesized image in which the second real image and virtual image are synthesized.

11 Claims, 13 Drawing Sheets

(51) Int. Cl.
| | |
|---|---|
| H04N 13/239 | (2018.01) |
| G02B 27/01 | (2006.01) |
| H04N 5/272 | (2006.01) |
| G06F 3/01 | (2006.01) |
| H04N 13/366 | (2018.01) |
| H04N 5/265 | (2006.01) |

(52) U.S. Cl.
CPC .......... *G06T 19/006* (2013.01); *H04N 5/265* (2013.01); *H04N 5/272* (2013.01); *H04N 13/239* (2018.05); *H04N 13/366* (2018.05); *G02B 2027/014* (2013.01); *G02B 2027/0138* (2013.01)

(58) Field of Classification Search
CPC .. H04N 13/239; H04N 13/344; H04N 13/366; H04N 5/265; H04N 5/27
See application file for complete search history.

(56) References Cited

U.S. PATENT DOCUMENTS

| | | | | |
|---|---|---|---|---|
| 2010/0295924 | A1* | 11/2010 | Miyatani | H04N 13/344 348/46 |
| 2010/0321383 | A1* | 12/2010 | Nakamura | G06F 3/011 345/419 |
| 2012/0020548 | A1* | 1/2012 | Kao | H04N 13/261 382/154 |
| 2016/0379413 | A1* | 12/2016 | Yamamoto | G06T 19/006 345/427 |
| 2018/0041751 | A1* | 2/2018 | Tanaka | G06F 3/011 |

FOREIGN PATENT DOCUMENTS

| | | |
|---|---|---|
| JP | 2011-216958 A | 10/2011 |
| JP | 2012-003327 A | 1/2012 |
| JP | 2013-090031 A | 5/2013 |
| JP | 2014-49890 A | 3/2014 |
| WO | 2014/156033 A1 | 10/2014 |

OTHER PUBLICATIONS

Kanbara, et al., "A Stereoscopic Video See-through Augmented Reality System Based on Real-time Vision-based Registration", Proceedings IEEE 2000 Virtual Reality (VR2000), New Brunswick, NJ, Mar. 18-22, 2000, Los Alamitos, CA, IEEE Comp. Soc, US, Mar. 18, 2000, pp. 255-262, XP000987500.

* cited by examiner

INFORMATION PROCESSING APPARATUS, INFORMATION PROCESSING METHOD, AND STORAGE MEDIUM

TECHNICAL FIELD

The present invention relates to an information processing apparatus and an information processing method for presenting mixed reality.

BACKGROUND ART

Intensive studies have been made recently on mixed reality (MR) to achieve a seamless combination of a real space and a virtual space. An image display device for presenting mixed reality has, for example, the following configuration. An image display device displays an image of a virtual reality space generated depending on the position and orientation of the image capturing device (e.g., a virtual object and character information drawn by computer graphics) superposed on an image of a real space captured by the image capturing device, such as a video camera. Examples of the image display device include a head mounted display (HMD).

To present an image in which an object is located relatively close to the image capturing device (a close-range view) and an image in which an object is located relatively far from the image capturing device (a distant view) to the user without a feeling of strangeness using such an HMD, it is necessary to adjust the position of the focal point of the image capturing device.

PTL 1 discloses an HMD which has a mechanism for adjusting baseline lengths of right and left image capturing devices to change focal positions.

PTL 2 discloses preparing a pair of right and left image capturing devices with different baseline lengths for each of a close-range view and a distant view, and switching the image capturing devices to be used depending on a mode.

The method disclosed in PTL 1 has, however, the problems of a complicated apparatus configuration and an increased apparatus size. The method disclosed in PTL 2 has the problems of increased cost and increased weight of the HMD due to the necessity to prepare the image capturing devices corresponding to the distant view and the close-range view.

CITATION LIST

Patent Literature

PTL 1: Japanese Patent Laid-Open No. 7-84326
PTL 2: Japanese Patent Application No. 2014-49890
PTL 3: Japanese Patent Laid-Open No. 2011-216958
PTL 4: Japanese Patent Laid-Open No. 2013-090031

SUMMARY OF INVENTION

An information processing apparatus according to the present disclosure includes: an image acquisition unit configured to acquire a first real image captured by a first image capturing device from a first viewpoint and a second real image captured by a second image capturing device from a second viewpoint which is different from the first viewpoint; and an output unit configured to output, to a first display unit for presenting an image to the user's left eye and to a second display unit for presenting an image to the user's right eye, a mixed image in which the first real image and a virtual image are mixed if a first mode is set, and output, to the first display unit, a mixed image in which the first real image and a virtual image are mixed if a second mode which is different from the first mode is set, and output, to the second display unit, a mixed image in which the second real image and virtual image are mixed.

According to the specification of the present application, a mixed reality image which provides a viewer with no feeling of strangeness can be provided regardless of the distance to an object without the need of a complicated apparatus configuration.

Further features of the present invention will become apparent from the following description of exemplary embodiments with reference to the attached drawings.

DESCRIPTION OF EMBODIMENTS

First Embodiment

Before providing description of embodiments according to the present invention, a hardware configuration on which an information processing apparatus described in each embodiment is mounted is described with reference to FIG. 13.

Figure 13:
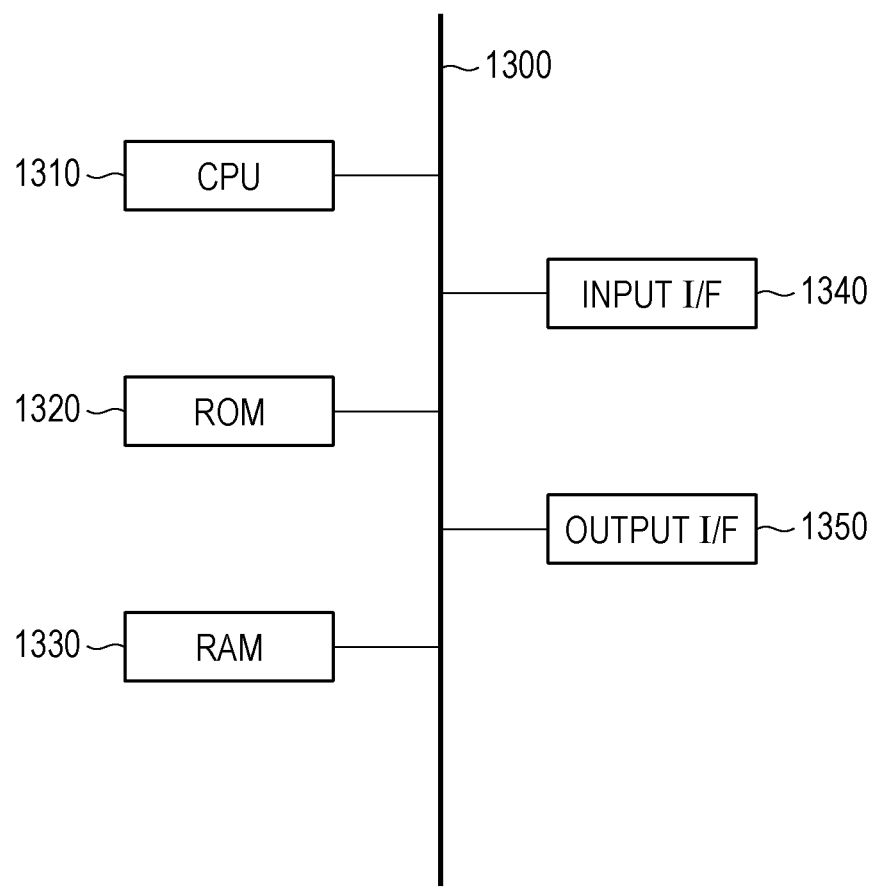
FIG. 13 illustrates an exemplary hardware configuration of the information processing apparatus of the present invention.

FIG. 13 is a hardware configuration diagram of an information processing apparatus in the present embodiment. In FIG. 13, a CPU 1310 collectively controls devices connected via a bus 13000. The CPU 1310 reads and executes process steps and programs stored in read-only memory (ROM) 1320. An operating system (OS), each processing program, a device driver, and the like related to the present embodiment are stored in the ROM 1320, are temporarily stored in random-access memory (RAM) 1330, and are executed by the CPU 1310. An input I/F 1340 inputs a signal from an external device (e.g., a display device or a manipulation device) as an input signal in a format processable in the information processing apparatus 1. An output I/F 1350 outputs a signal to an external device (e.g., a display device) as an output signal in a format processable by the display device.

Figure 1:
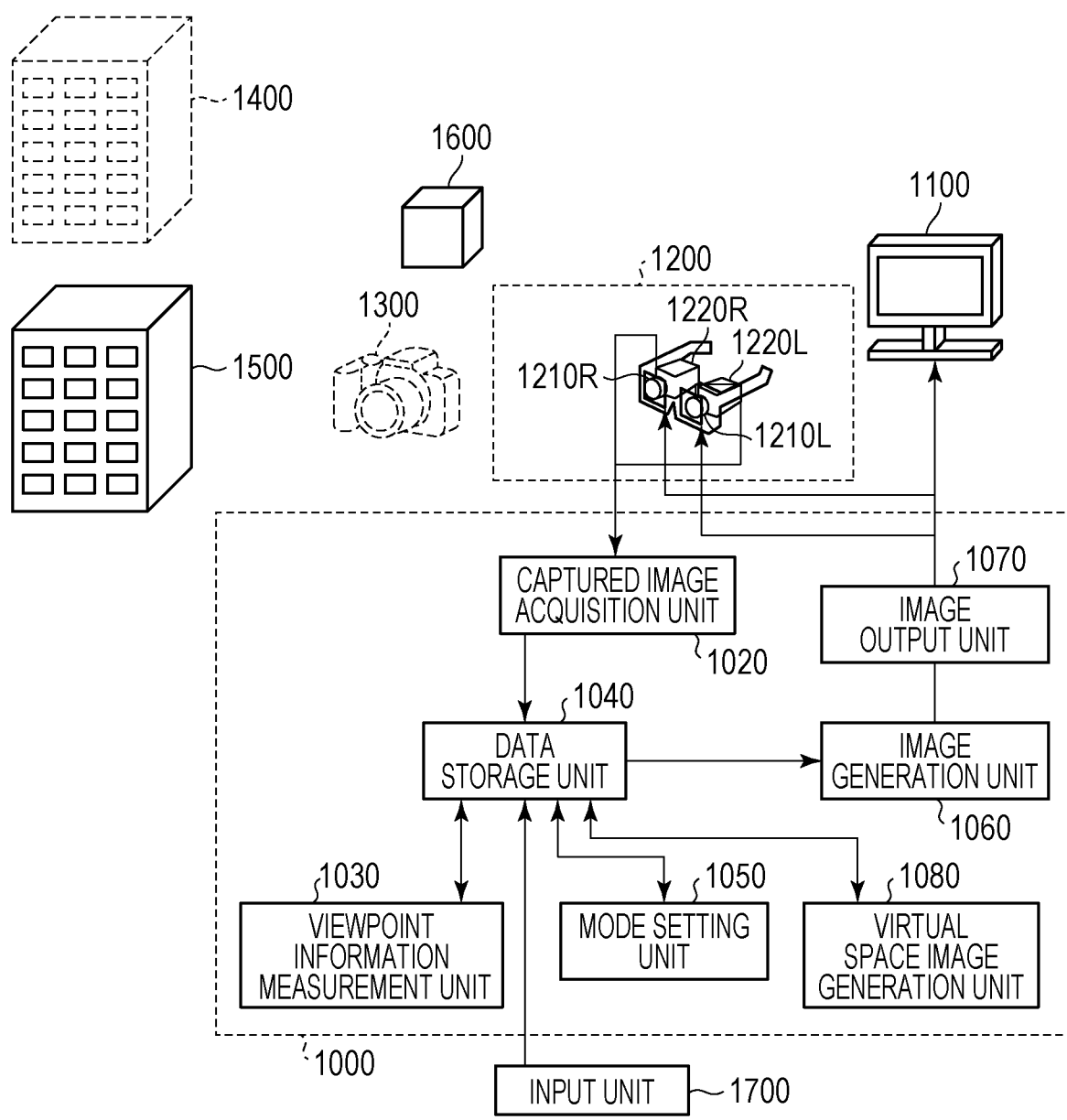
FIG. 1 is a block diagram of a system provided with an information processing apparatus according to a first embodiment.

FIG. 1 is a block diagram of an exemplary system configuration provided with an information processing apparatus 1000 according to the present embodiment. As illustrated in FIG. 1, the information processing apparatus 1000 according to the present embodiment is connected to a display device 1100, an input unit 1700, and head mounted display device 1200. The information processing apparatus 1000 includes a captured image acquisition unit 1020, a data storage unit 1040, a viewpoint information measurement unit 1030, a mode setting unit 1050, a virtual space image generation unit 1080, an image generation unit 1060, and an image output unit 1070.

An image capturing device 1220 (an image capturing unit 1220R and an image capturing unit 1220L) and a display device 1210 (a display unit 1210R and a display unit 1210L) are attached to the head mounted display device (hereafter, "HMD") 1200. A viewer who mounts the HMD 1200 on the head is capable of viewing a stereoscopic image of a mixed reality space (hereafter, "MR image") displayed in the display device 1210. That is, the viewer views, via the display device 1210, an MR image in which a real object 1600 and a virtual object 1300 are synthesized in FIG. 1. Further, the viewer views, via the display device 1210, an MR image in which a real object 1500 and a virtual object 1400 are synthesized. The distance between the real object 1500 and the HMD 1200 and the distance between the real object 1600 and the HMD 1200 are different from each other. In the HMD 1200 of the present invention, unlike the apparatus disclosed in PTL 1, a baseline length and a convergence angle between the image capturing unit 1220R and the image capturing unit 1220L are fixed, and focal positions of the image capturing unit 1220R and the image capturing unit 1220L are also fixed.

The present embodiment is not limited to stereoscopic image capturing and image display, but three or more image capturing units and display units may be provided. The present invention is implementable in a configuration with at least one image capturing unit and at least one display unit. The present invention is not limited to the use of the HMD 1200 but is implementable in a configuration provided with no image capturing device 1220. Hereinafter, regarding the display unit for the right eye and the display unit for the left eye, the display device is denoted by 1210 and the image capturing device is denoted by 1220 ("R" and "L" are not used) unless otherwise specified. In the present embodiment, the display is described as a head mounted display device, but the invention may be a display device mounted on a user's face instead of the head.

Each function of the information processing apparatus 1000 is described below.

The captured image acquisition unit 1020 acquires a captured image for the right eye and a captured image for the left eye transmitted from the image capturing device 1220. The acquired right captured image and the acquired left captured image are stored in the data storage unit 1040. Hereinafter, the term "captured image" is used when both the right captured image and the left captured image are denoted.

The viewpoint information measurement unit 1030 measures the position and orientation of the image capturing device from the captured image stored in the data storage unit 1040, and obtains viewpoint position and orientation information (position and orientation acquisition). Instead of acquiring the position and orientation information of the image capturing device, the position and orientation information of the center of the viewer's head, and the center of the image capturing unit 1220L and the image capturing unit 1220R may be acquired. Various studies and reports have been made on the method for measuring the viewpoint position and orientation information, and any technique may be used herein. A magnetic sensor or an optical sensor may be used. The viewpoint position and orientation information is then stored in the data storage unit 1040.

The mode setting unit 1050 sets a distant view mode or a close-range view mode from, for example, an event input from the input unit 1700, and stores the set mode in the data storage unit 1040.

The virtual space image generation unit 1080 generates a virtual space image in accordance with the data of a virtual space stored in the data storage unit 1040. The data of the virtual space includes 3D data acquired by 3D measurement of the virtual object 1300, the vertical object 1400, the real object 1600, and the real object 1500 using a 3D digitizer or a known technique, data related to each of virtual objects constituting the virtual space, and data related to a light source illuminating the virtual space, and the like. Virtual space image is then stored in the data storage unit 1040.

The image generation unit 1060 generates a mixed reality image in accordance with the right captured image or the left captured image, the virtual space image, and the position and orientation information from the mode setting stored in the data storage unit 1040. Details of the generation of the mixed reality image are described with reference to the flowchart of FIG. 5.

The image output unit 1070 displays a right mixed reality image generated by the image generation unit 1060 on the display unit 1210R and displays a left mixed reality image generated by the image generation unit 1060 on the display unit 1210L.

At this time, the left mixed reality image, the right mixed reality image, or other images may be displayed in the display device 1100 which may output images.

As described above, the data storage unit 1040 stores various types of information, and is constituted by RAM, a hard disk drive device, and the like. It is supposed that information described as known information in the present embodiment is also stored in the data storage unit 1040 besides the information described in the above description to be stored in the data storage unit 1040.

Each of these function units is implemented by the CPU 1310 developing programs stored in the ROM 1320 to the RAM 1330, and executing processes in accordance with the flowcharts described later. If, for example, the hardware is constituted as a substitution of software processing using the CPU 1310, it is only necessary to configure a calculating unit and a circuit corresponding to the process of each function unit described herein.

Figure 5:
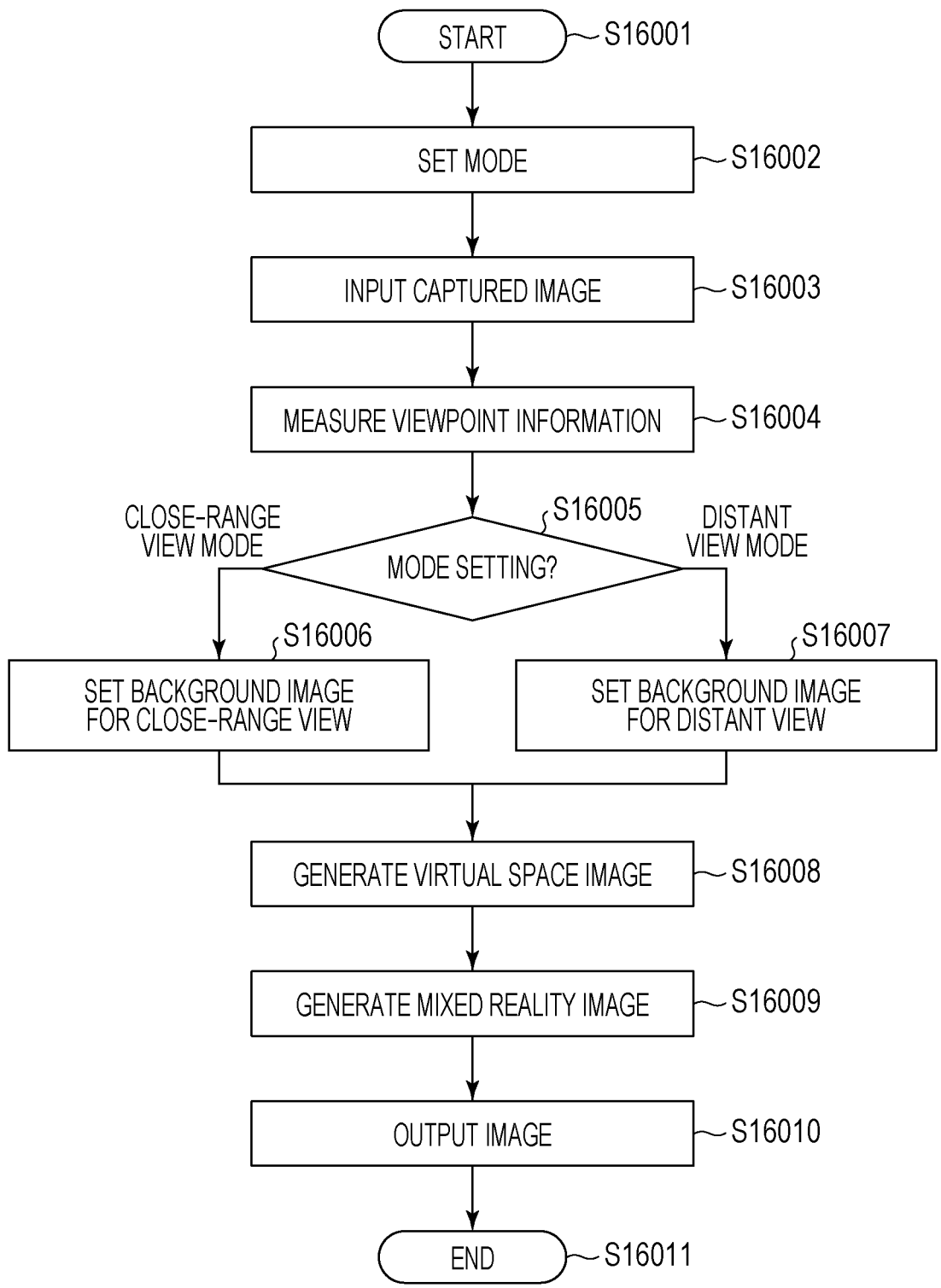
FIG. 5 is a process flowchart of the first embodiment.

Hereinafter, a generation process of the mixed reality image by the information processing apparatus 1000 is described with reference to the flowchart of FIG. 5.

Step S16001

In step S16001, a process by the information processing apparatus 1000 is started.

Step S16002

Next, in step S16002, the mode setting unit 1050 sets the mode between a distant view (a first mode) or a close-range view (a second mode) in accordance with the data input from the input unit 1700. Any input method capable of setting the mode may be used here: for example, input from a GUI, text input, input from a game controller, or a gesture. The process proceeds to step S16003.

Step S16003

In step S16003, the captured image acquisition unit 1020 acquires a captured image from the HMD 1200 and stores the acquired captured image in the data storage unit 1040. The process proceeds to step S16004.

Step S16004

In step S16004, the viewpoint information measurement unit 1030 measures the position and orientation information of the image capturing device 1220 in accordance with the captured image stored in the data storage unit 1040 in step S16003. Various studies and reports have been made on the method for measuring, and any technique may be used. The process proceeds to step S16005.

Step S16005

In step S16005, the process proceeds to step S16006 if the mode input in step S16002 is the close-range view mode, and proceeds to step S16007 if the mode is the distant view mode.

Step S16006

In step S16006, the image generation unit 1060 sets, as a background image, the captured image acquired by the image capturing unit 1220R to generate the mixed reality image for the close-range view to be displayed in the display unit 1210R. Similarly, the image generation unit 1060 sets, as a background image, the captured image acquired by the image capturing unit 1220L to generate the mixed reality image for the close-range view to be displayed in the display unit 1210L. That is, the image generation unit 1060 sets different images in consideration of a parallax on the left and right display devices as the background images. A part of the captured image acquired by the image capturing unit 1220R may be cut out and used as the background image. Similarly, a part of the captured image acquired by the image capturing unit 1220L may be cut out and used as the background image.

Then, in the present embodiment, different images in consideration of a parallax are set in the left and right display devices as background images as described above. Therefore, the viewer can view the image stereoscopically.

Step S16007

In step S16007, the image generation unit 1060 sets, as the background image, the captured image acquired by the image capturing unit 1220R to generate the mixed reality image for the distant view to be displayed in the display unit 1210R. Similarly, the image generation unit 1060 sets, as the background image, the captured image acquired by the image capturing unit 1220R to generate the mixed reality image for the distant view to be displayed in the display unit 1210L. That is, the same image is set for the right and left display devices.

Here, a problem that the distant view real object 1500 and the distant view virtual object 1400 are not appropriately viewed stereoscopically in the image capturing device with fixed baseline length and convergence angle as in the present invention is described in detail with reference to FIGS. 2A, 2B, 3A and 3B.

Figure 2A:
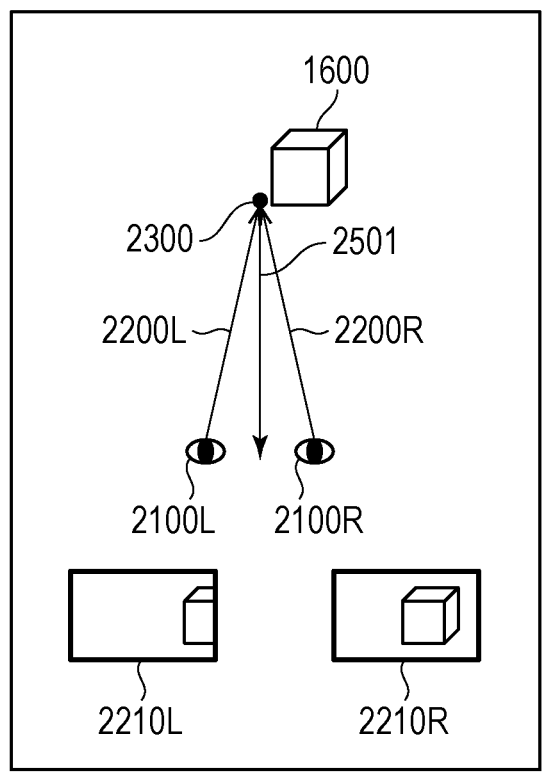
FIG. 2A is a conceptual diagram in a case where an object is located at a close position (a close-range view).
Figure 2B:
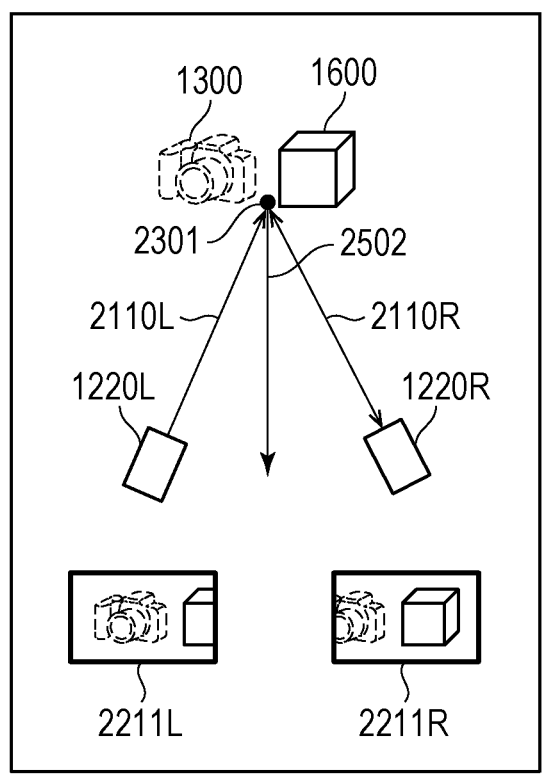
FIG. 2B is a conceptual diagram in a case where an object is located at a close position (a close-range view).

FIGS. 2A and 2B illustrate the real object 1600 located at a close position viewed with the naked eyes or through the HMD 1200. The same components as those of FIG. 1 are denoted by the same reference numerals and are not described.

FIG. 2A illustrates a state in which the viewer is viewing the real object 1600 located close to the viewer with the naked eyes.

The right eye 2100R is the right eye of the viewer (user) and the left eye 2100L is the left eye of the viewer.

A gaze 2200R is a gaze direction of the viewer's right eye 2100R and a gaze 2200L is a gaze direction of the viewer's left eye 2100L.

A focal position 2300 is a focal point at which the viewer's gazes cross.

A distance 2501 is a distance from the midpoint of the viewer's both eyes to the focal point.

An image 2210R is an image viewed with the naked eye of the right eye 2100R and an image 2210L is an image viewed with the naked eye of the left eye 2100L. The viewer can view an image stereoscopically by viewing the image 2201R and the image 2210L with the right and the left eyes, respectively.

FIG. 2B illustrates a state in which the viewer, with the HMD mounted thereon, is viewing the real object 1600 and the virtual object 1300 located close to the HMD 1200.

The focal position 2301 is a focal point of the image capturing unit 1220L and the image capturing unit 1220R fixed to the HMD 1200. Here, it is supposed that the distance (baseline length) between the image capturing unit 1220R and the image capturing unit 1220L of the HMD 1200 and the distance between the viewer's eyes of FIG. 2A are substantially the same, and the focal position 2301 of the image capturing unit 1220L and the image capturing unit 1220R fixed to the HMD 1200 and the focal position 2300 of the viewer's naked eyes are substantially the same.

A distance 2502 is a distance from the center of the image capturing device 1220 of the HMD 1200 to the focal position 2301.

An image 2211L is a mixed reality image displayed in the display unit 1210L and an image 2211R is a mixed reality image displayed in the display unit 1210R. The method for generating the mixed reality image is described in detail later.

In the present embodiment, the focal position 2300 and the focal position 2301 are substantially the same as described above. That is, the distance 2501 and the distance 2502 are substantially the same. Therefore, since the image 2210L and the image 2211L becomes substantially the same, a difference between the image viewed with the naked eyes and the image viewed through the HMD decreases, a stereoscopic image like those being viewed with the naked eyes can be viewed.

Figure 3A:
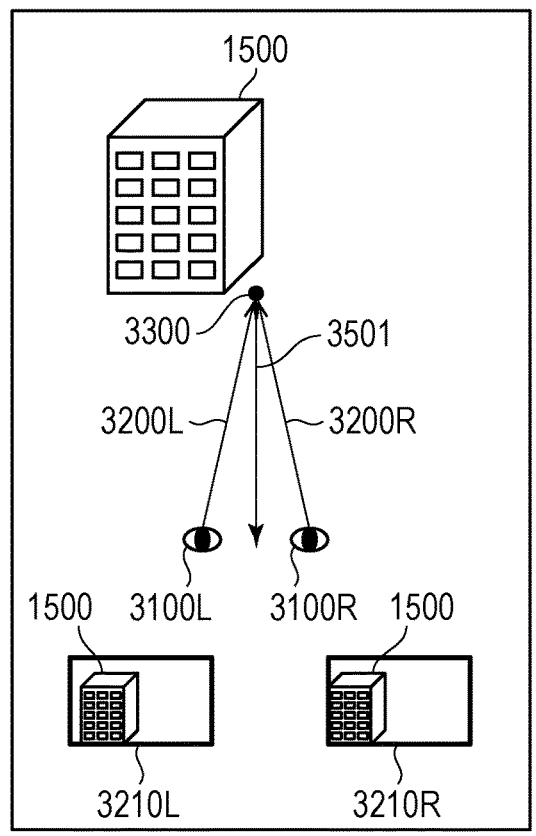
FIG. 3A is a conceptual diagram in a case where an object is located at a distant position (a distant view).
Figure 3B:
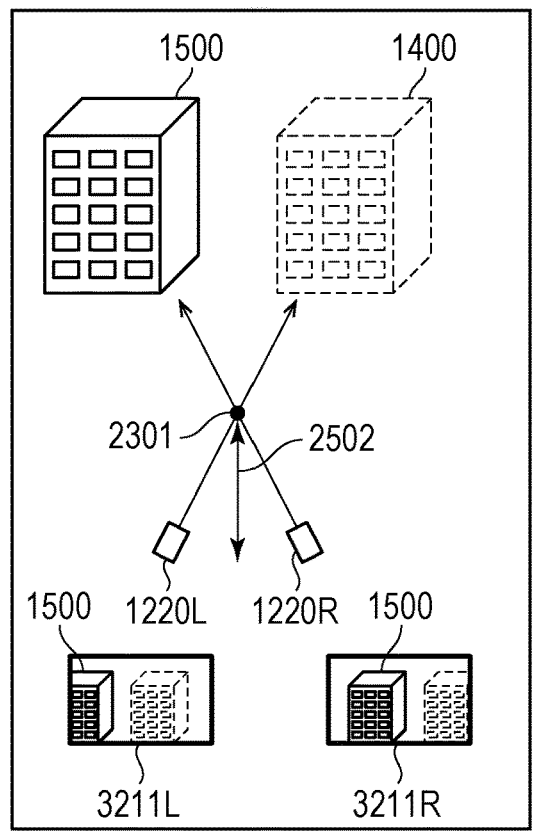
FIG. 3B is a conceptual diagram in a case where an object is located at a distant position (a distant view).

Next, an example in which the real object to be viewed is located distant from the naked eyes or the HMD 1200 is described. FIGS. 3A and 3B illustrate a case where an object located at a distant position is viewed with the naked eyes or through the HMD 1200. The same components as those of FIGS. 1, 2A and 2B are denoted by the same reference numerals and are not described.

FIG. 3A illustrates a state in which the viewer is viewing the real object 1500 located at a distant position with the naked eye.

A gaze 3200R is a gaze direction of the viewer's right eye 3100R and a gaze 3200L is a gaze direction of the viewer's left eye 3100L.

A focal position 3300 is a focal point at which the viewer's gazes cross.

A distance 3501 is a distance from the midpoint of the viewer's both eyes to the focal point.

An image 3210R is an image viewed with the naked eye of the right eye 3100R and an image 3210L is an image viewed with the naked eye of the left eye 3100L.

In FIG. 3A, a distance 3501 is longer than a distance 2501, and the images 3210R and 3210L viewed with both eyes of the viewer have a lower parallax.

FIG. 3B illustrates a case where the real object 1500 and the virtual object 1400 located distant from the HMD 1200 are synthesized.

An image 3211L is a mixed reality image displayed in the display unit 1210L and an image 3211R is a mixed reality image displayed in the display unit 1210R. The method for generating the mixed reality image is described in detail later.

Here, the greater the difference between the distance 3501 and the distance 2502, the greater the difference between the image 3210L and the image 3211L becomes. Therefore, the difference between the image viewed with the naked eyes and the image viewed through the HMD 1200 becomes greater and the viewer feels strangeness.

In the present embodiment, the same image is set in both the right and left display units to solve this problem as described above. Since the image has no parallax and is not able to be viewed stereoscopically, but the feeling of strangeness described above can be eliminated. If the object is located at some distance as illustrated in FIG. 3B, the image has substantially no parallax even when viewed with the naked eyes. Therefore, if the same image is set as in the present embodiment, the viewer feels substantially no strangeness.

Step S16008

In step S16008, the virtual space image generation unit 1080 generates a virtual image from the position and orientation information of the image capturing device 1220 obtained in step S16004 and the information about the virtual object stored in the data storage unit 1040.

Step S16009

In step S16009, the image generation unit 1060 generates an image in which the virtual image generated in step S16008 and the background image set in step S16006 or step S16007 are synthesized, and the process proceeds to step S16010.

The image of the close-range mode and the image of the distant view mode generated at the time are described with reference to FIGS. 2A, 2B, 3A, 3B and 4. The same components as those of FIG. 1 are denoted by the same reference numerals and are not described. Description on the known method for generating the mixed reality image is omitted.

FIG. 2B illustrates an example in which the real object 1600 and the virtual object 1300 located at close positions are viewed through the HMD 1200 as described above. Therefore, if the close-range mode is set, the image 2211R generated from the captured image acquired from the image capturing unit 1220R, the position and orientation of the image capturing unit 1220R measured from the captured image, and the virtual space is displayed (presented) in the display unit 1210R, and the image 2211L is similarly displayed in the display unit 1210L.

If the real object 1500 located distant from the viewer is viewed as illustrated in FIG. 3B, since the focal position 2301 of the image capturing device 1220 is distant from the real object 1500, the viewer viewing each of the captured images feels great strangeness.

Figure 4:
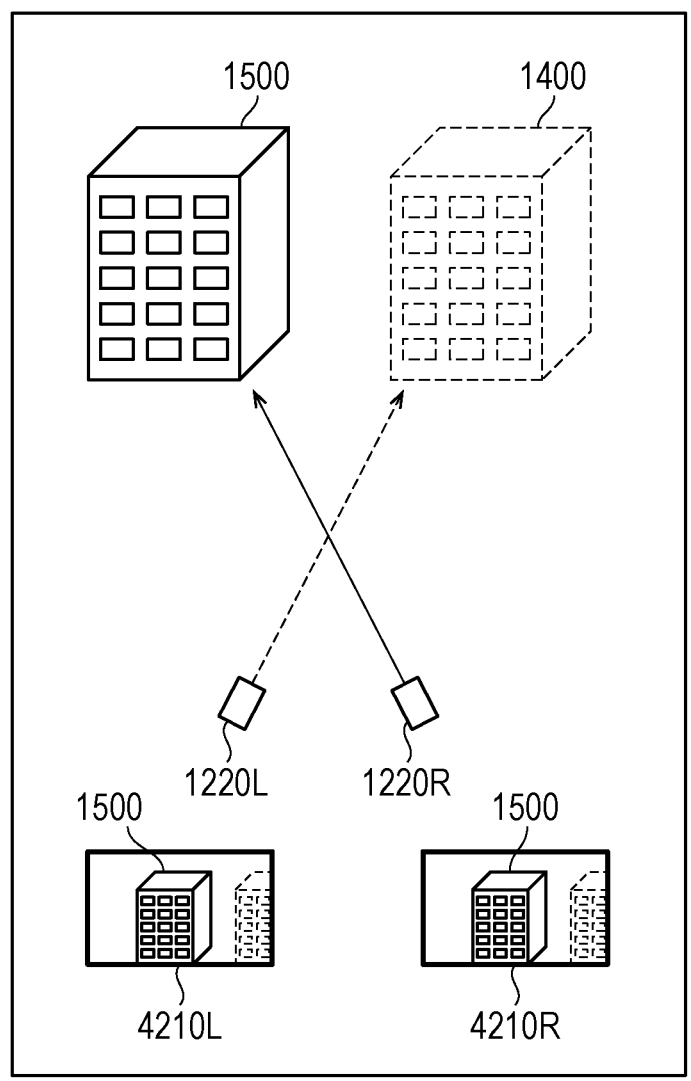
FIG. 4 illustrates an embodiment in the first embodiment.

Then, in the present embodiment, as described in FIG. 4, when the distant view mode is set, the following process is conducted. That is, if the distant view mode is set, as set in step S16007, the same image is displayed in the display unit 1210R and in the display unit 1210L.

Step S16010

In step S16010, the image generated in step S16009 is displayed in the display unit 1210L and the display unit 1210R by the image output unit 1070, and the process proceeds to step S16011.

In step S16011, the process is completed.

With the process described above, an image which provides a viewer with no feeling of strangeness can be provided even if the distance to the object is far from the focal position.

Second Embodiment

The close-range view mode or the distant view mode is set depending on the mode input from the input unit 1700 in the first embodiment, whereas an example in which a mode is set automatically based on a distance between a position of a HMD and an object to be viewed by a viewer is described in the present embodiment.

Figure 6:
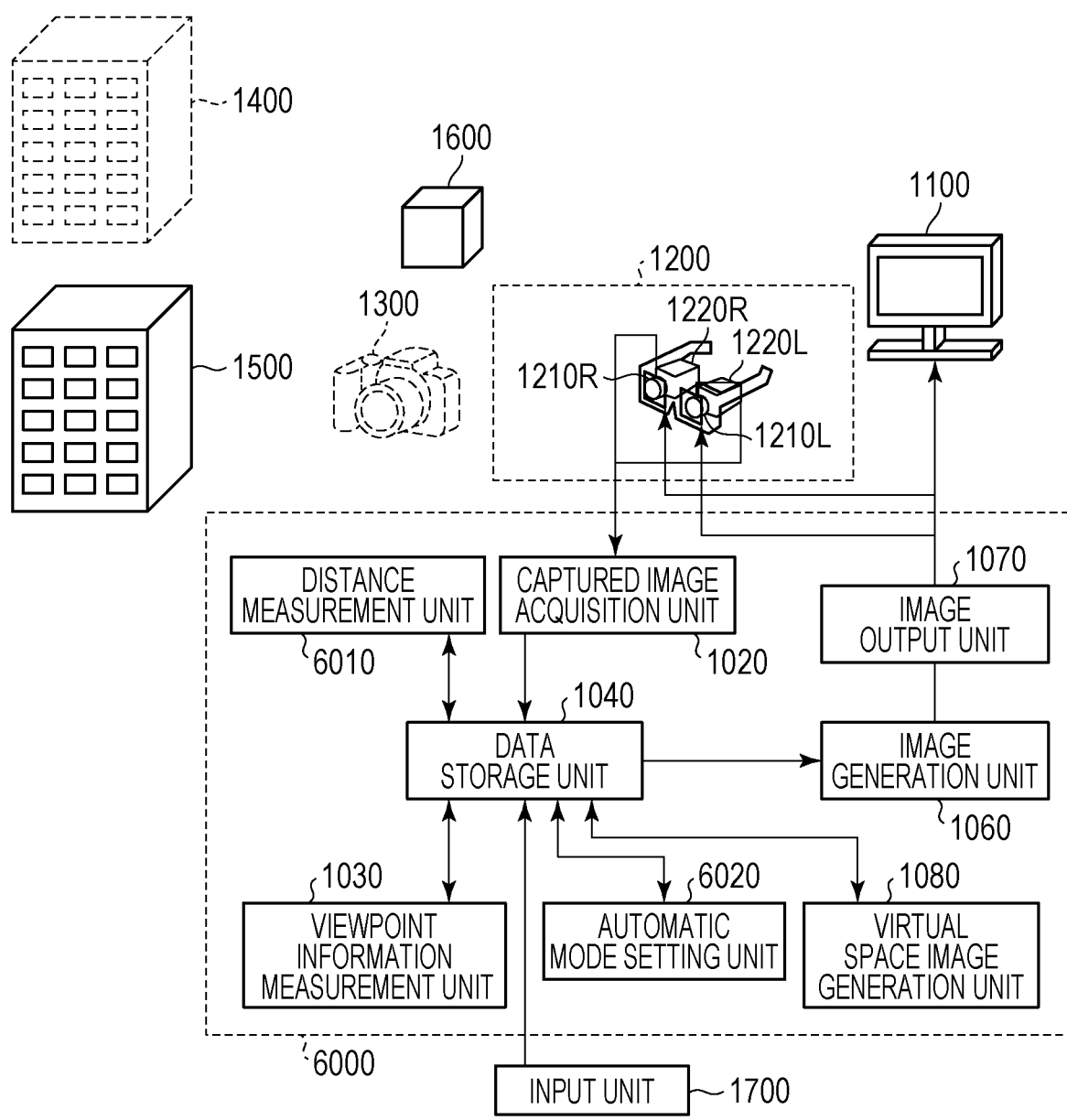
FIG. 6 is a block diagram of a system provided with the information processing apparatus according to the first embodiment.

A system provided with an information processing apparatus 6000 according to the present embodiment is described with reference to the block diagram of FIG. 6. The same components as those of FIG. 1 are denoted by the same reference numerals and are not described.

The information processing apparatus 6000 is described below.

A distance measurement unit 6010 measures a distance between viewpoint position information stored in a data storage unit 1040 and a virtual object or a real object reflected in a captured image 1220 (distance acquisition), and stores the measured distance in a database as distance information. Acquisition of the distance is described later.

A mode setting unit 6020 automatically sets a distant view mode if the distance is equal to or longer than a predetermined distance and sets a close-range view mode otherwise in accordance with the distance information stored in the data storage unit 1040, and stores the set mode in the data storage unit 1040.

Figure 7:
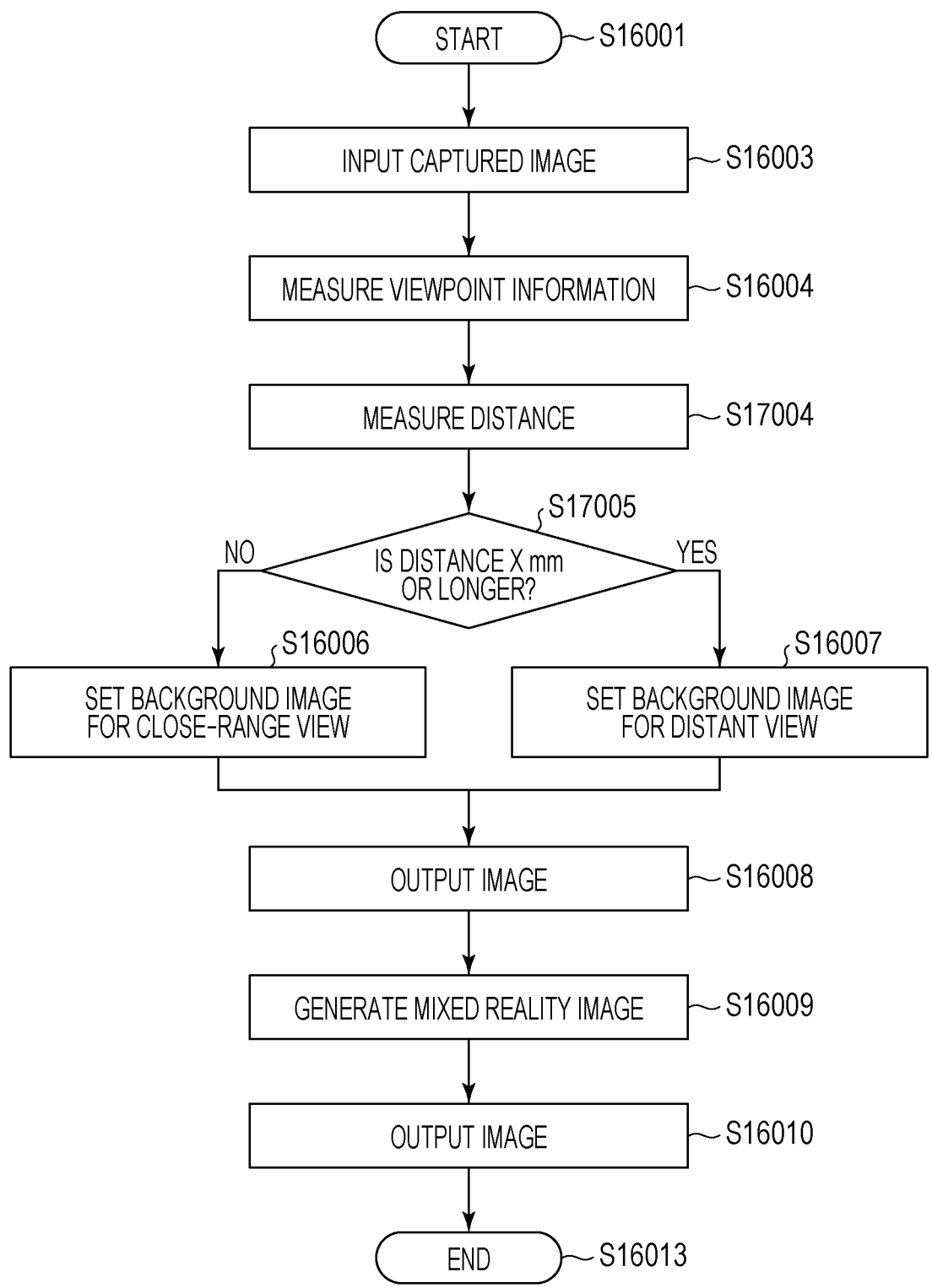
FIG. 7 is a process flowchart of a second embodiment.

FIG. 7 is a flowchart of a process executed by the information processing apparatus 6000 to generate a mixed reality image and output the mixed reality image to a display device 1210 or a display device 1100 of a HMD 1200. The same components as those of FIG. 5 are denoted by the same reference numerals and are not described.

Step S17004

Figure 8:
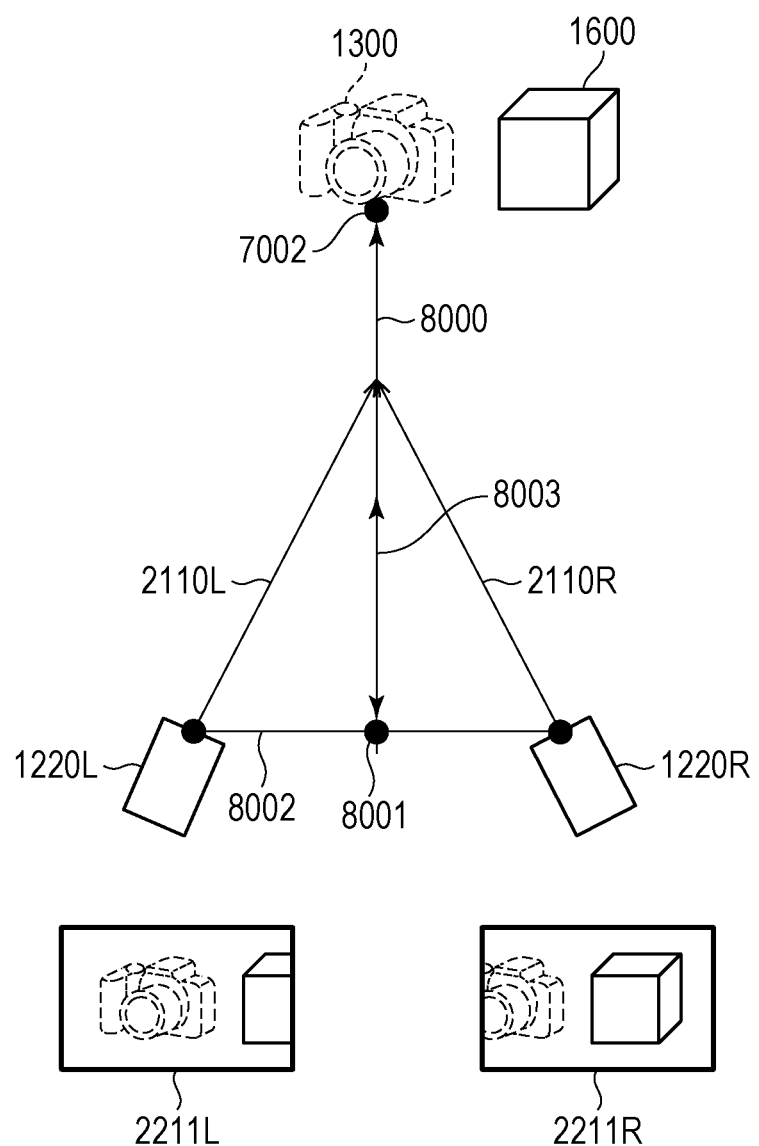
FIG. 8 illustrates an embodiment in the second embodiment.

In step S17004, the distance measurement unit 6010 obtains a distance between the position of the image capturing device 1220 obtained in step S16004 and a virtual object or a real object gazed by the viewer. The method for calculating the distance is described in detail with reference to FIG. 8. The same components as those of FIGS. 2A and 2B are denoted by the same reference numerals and are not described.

A distance 8000 between a point 7002 at which a vector 8003 perpendicular to a line segment 8002 crosses a virtual object 1300 and the point 8001 is obtained from a midpoint 8001 of the line segment 8002 connecting the image capturing device 1220L and the image capturing unit 1220R, and the process proceeds to step S17005.

Although the distance is obtained by the technique described above in the present embodiment, the virtual object or the real object gazed by the viewer may be specified by, for example, a gesture, a game controller, a keyboard, and a tablet.

Step S17005

In step S17005, the mode setting unit 6020 proceeds the process to step S16007 if the distance 8000 is equal to or longer than an arbitrary Xmm set by the viewer or the system, and proceeds the process to step S16006 if the distance 8000 is shorter than Xmm.

In the present embodiment, as described above, since either of the distant view mode or the close-range view mode can be set automatically by measuring the distance to the real object or the virtual object, an image which provides the viewer with no feeling of strangeness can be provided without requesting any special processes to the viewer.

Third Embodiment

In the first and the second embodiments, the captured image acquired from the image capturing device 1220 is used as the real image in the distant view mode and the close-range view mode. In the present embodiment, an example in which an information processing apparatus dynamically generates a background image is described.

Figure 9:
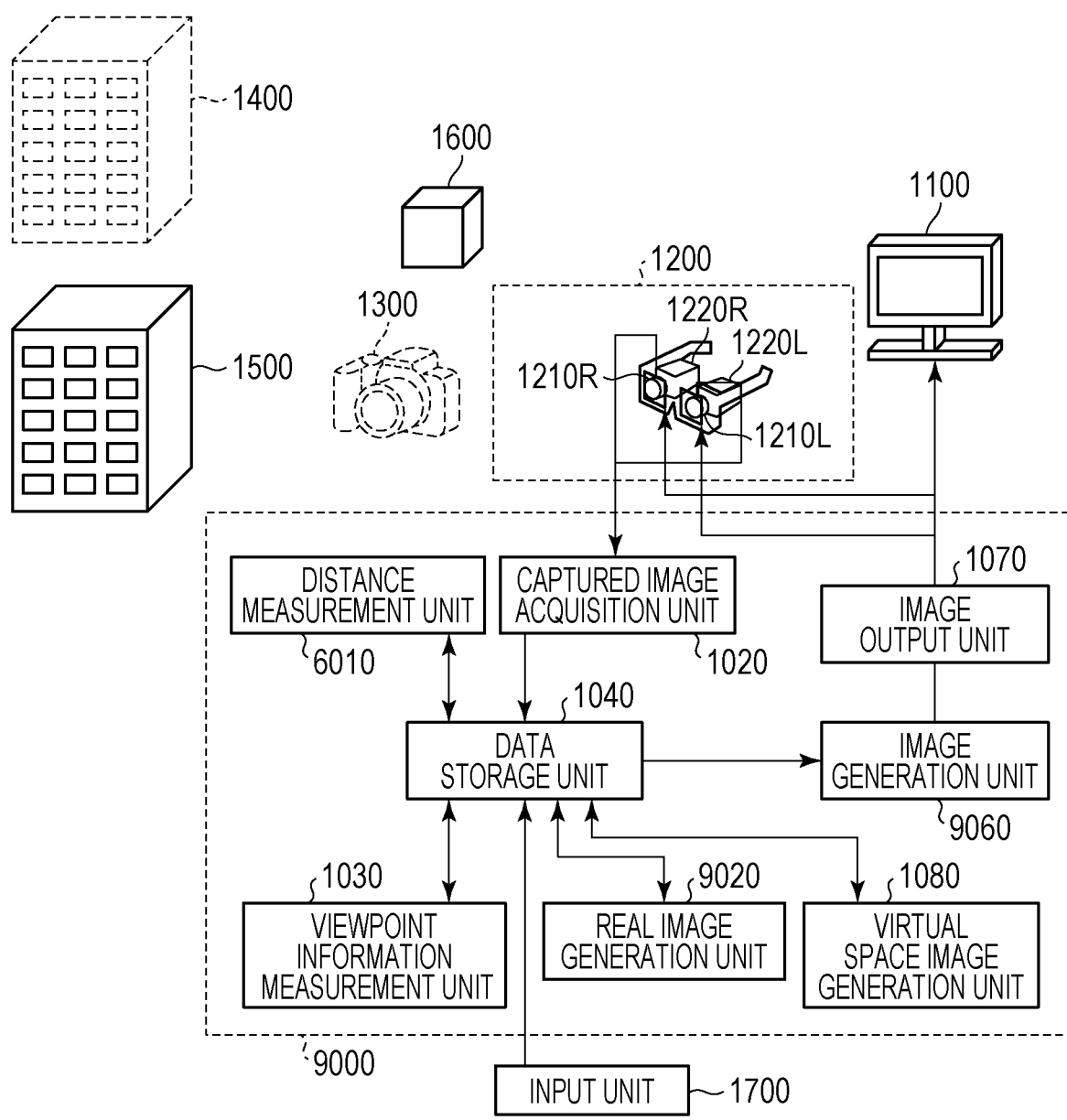
FIG. 9 is a block diagram of a system provided with an information processing apparatus according to a third embodiment.

A system provided with an information processing apparatus 9000 according to the present embodiment is described with reference to a block diagram of FIG. 9. The same components as those of FIGS. 1 and 6 are denoted by the same reference numerals and are not described. The present embodiment differs from the second embodiment in that a real image generation unit 9020 is added.

Figure 10:
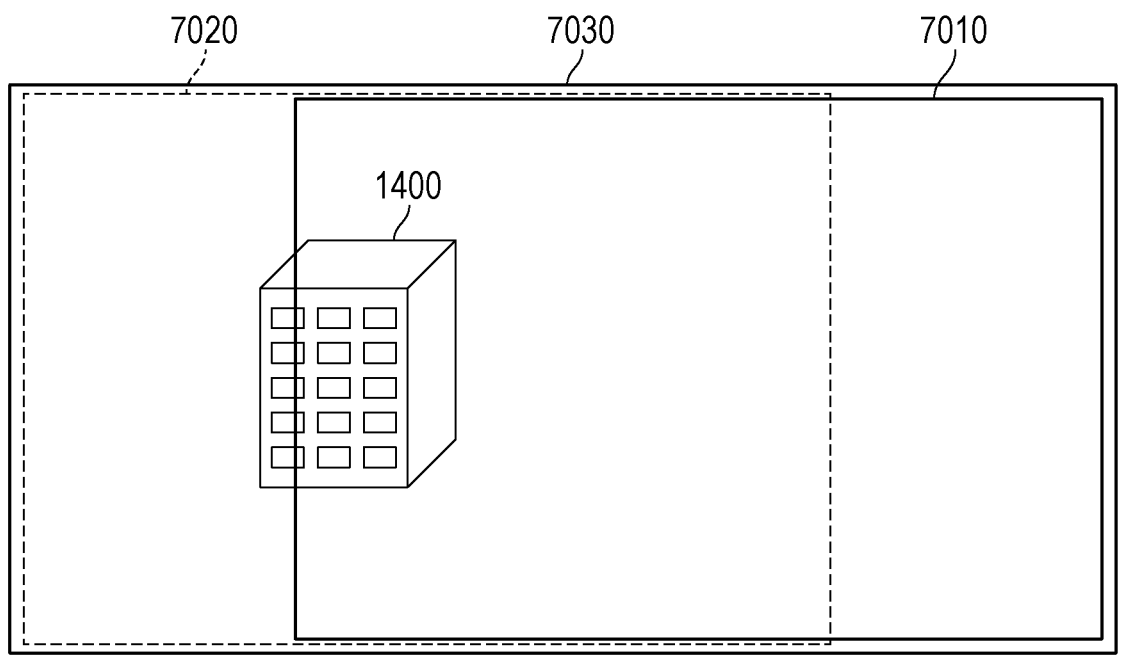
FIG. 10 illustrates an embodiment in the third embodiment.

The real image generation unit 9020 generates a background image 7030 illustrated in FIG. 10 in accordance with images 7010 and 7020 acquired by a captured image acquisition unit 1020 and a distance acquired from a distance measurement unit 6010. The real image generation unit 9020 generates a background image for generating a mixed reality image to be displayed in a display unit 1210R from the generated background image 7030, and also generates a background image for generating a mixed reality image to be displayed in a display unit 1210L. Details are described later.

Figure 12:
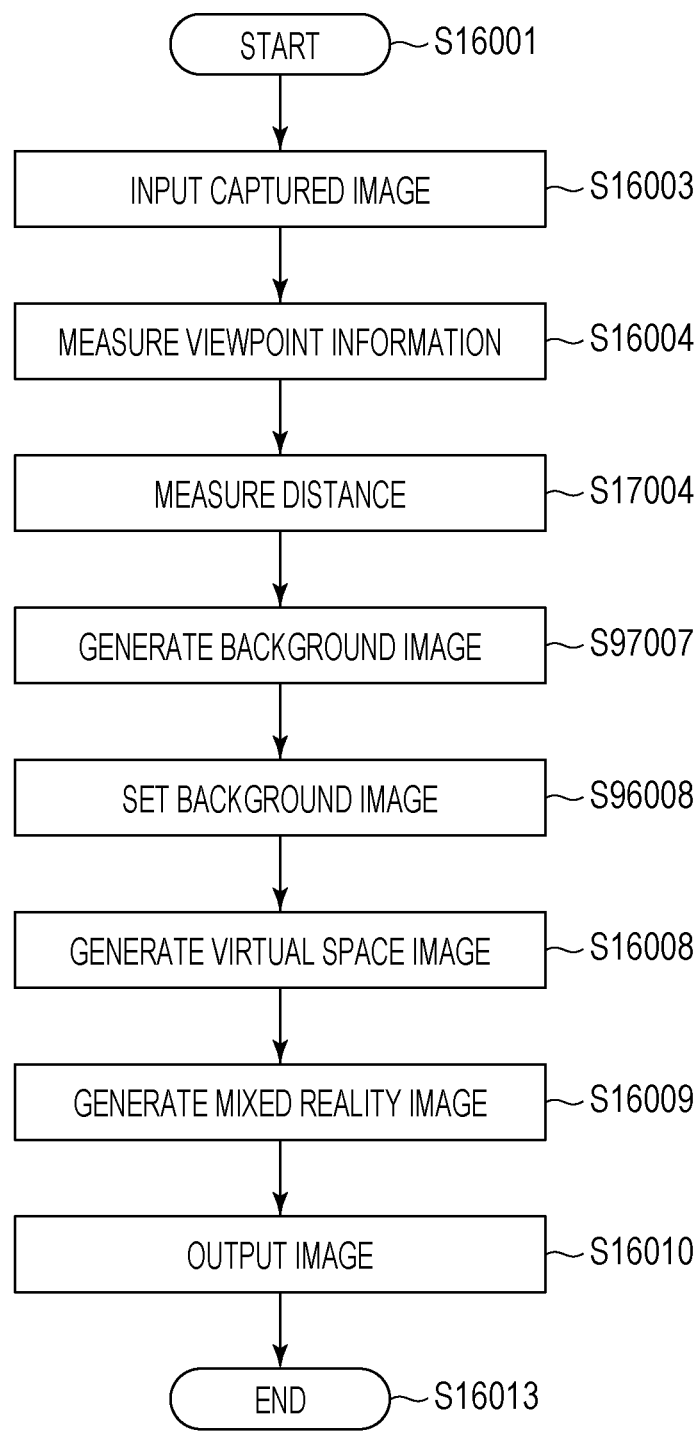
FIG. 12 is a process flowchart of the third embodiment.

FIG. 12 is a flowchart of a process executed by the information processing apparatus 9000 to generate the mixed reality image and output the mixed reality image to the display device 1210 of the HMD 1200 or the display device 1100. The same components as those of FIG. 7 are denoted by the same reference numerals and are not described.

Step S97007

In step S97007, the real image generation unit 9020 stitches the captured image acquired by the image capturing unit 1220. Hereinafter, this process is described in detail with reference to FIG. 10.

In FIG. 10, a background image 7030 is generated from captured images 7010 and 7020 acquired by the image capturing unit 1220L and the image capturing unit 1220R.

The captured image 7020 is an image acquired from the image capturing unit 1220L.

The captured image 7010 is an image acquired from the image capturing unit 1220R.

The background image 7030 is an image generated by stitching the captured image 7020 and the captured image 7010. Stitching is a publicly known technique (disclosed in PTL 3) and is not described herein.

After the background image 7030 is generated, the process proceeds to step S96008.

Step S96008

In step S96008, the real image generation unit 9020 generates a background image for the right and left eyes from the background image 7030 acquired in step S96007.

Figure 11:
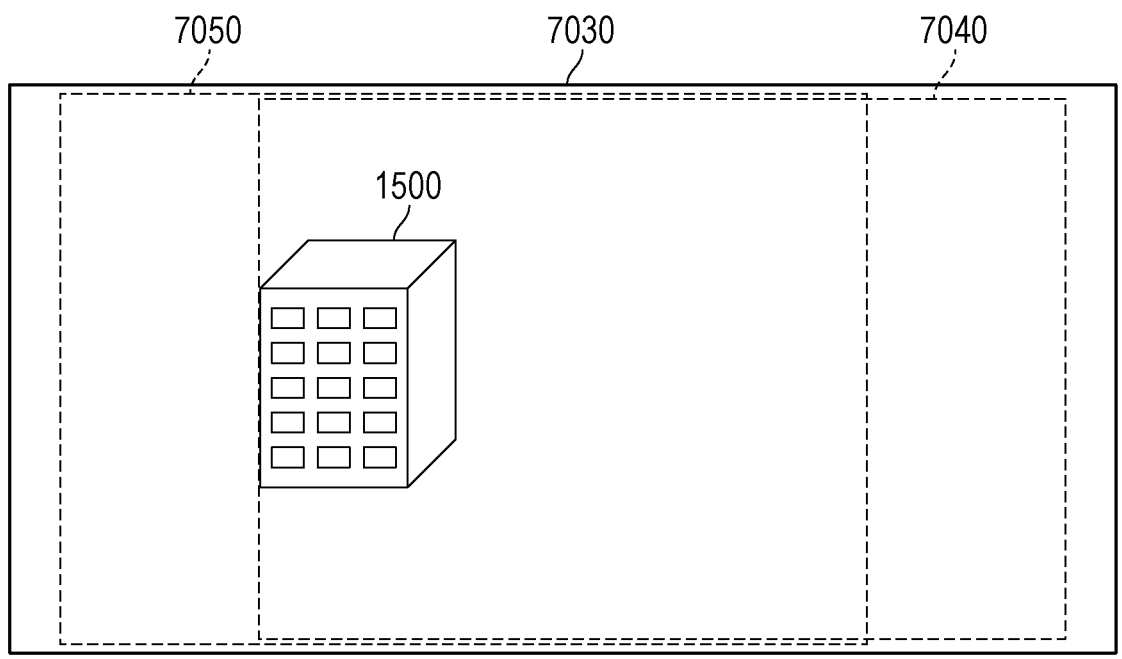
FIG. 11 illustrates an embodiment in the third embodiment.

FIG. 11 is a diagram illustrating generation of the background image for the right and left eyes from the background image 7030.

The feeling of strangeness is reduced by displaying the same image for the right and left eyes in the first and the second embodiments, whereas the image for the left eye 7020 and the image for the right eye 7010 are generated from a stitched image 7030 in the present embodiment. The method for generating a parallax image from an image is a publicly known technique (disclosed in PTL 4) and is not described herein.

A real image for the right eye 7040 is an image generated intended to be an image visible to the right eye when the viewer views an object to be viewed as illustrated in FIG. 3A.

A real image for the left eye 7050 is an image generated intended to be an image visible to the left eye when the viewer views an object to be viewed as illustrated in FIG. 3A.

The real image generation unit 9020 generates the real image for the right eye 7040 and the real image for the left eye 7050, and proceeds the process to step S16010.

With the process described above, an image which provides the viewer with no feeling of strangeness can be provided even if the distance to the object is far from the focal position. In the third embodiment, whether the process of step S96008 is executed may be determined depending on the mode set by the user as in the first embodiment.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-030860, filed Feb. 19, 2015, which is hereby incorporated by reference herein in its entirety.

The invention claimed is:

1. An information processing apparatus comprising:
one or more processors that operate to:
acquire a first real image captured by a first image capturing device from a first viewpoint which is far from a real object by a first distance and a second real image captured by a second image capturing device from a second viewpoint which is different from the first viewpoint and far from the real object by a second distance which is longer than the first distance such that the first real image and the second real image are different;

output, if a distant view mode is set, a first synthesized image in which the first real image and a virtual image are synthesized to both a first display for presenting an image to a user's left eye and to a second display for presenting an image to a user's right eye such that the first synthesized image is displayed, at the same time or contemporaneously, on the first display and the second display; and output, if a close-range view mode which is different from the distant view mode is set, a second synthesized image in which the first real image and the virtual image are synthesized to the first display, and a third synthesized image in which the second real image and the virtual image are synthesized to the second display such that the second synthesized image and the third synthesized image are displayed, at the same time or contemporaneously, on the first display and the second display, respectively.

2. The information processing apparatus according to claim 1, further comprising the first image capturing device configured to capture the first captured image, and the second image capturing device configured to capture the second captured image.

3. The information processing apparatus according to claim 1, wherein the one or more processors further operate to derive a first position and orientation which is the position and orientation of the first image capturing device, and a second position and orientation which is the position and orientation of the second image capturing device, wherein, if the close-range view mode is set, the one or more processors output, to the first display, a synthesized image in which a virtual image generated in accordance with the first position and orientation and the first real image are synthesized, and output, to the second display, a synthesized image in which a virtual image generated in accordance with the second position and orientation and the second real image are synthesized.

4. The information processing apparatus according to claim 1, wherein the one or more processors further operate to set either of the distant view mode or the close-range view mode.

5. The information processing apparatus according to claim 1, wherein the distant view mode or the close-range view mode is set in accordance with user input.

6. The information processing apparatus according to claim 1, wherein the one or more processors further operate to acquire a distance to an object included in the first captured image or the second captured image, wherein the one or more processors set the distant view mode or the close-range view mode in accordance with the acquired distance.

7. The information processing apparatus according to claim 6, wherein the one or more processors set the distant view mode if the distance is longer than a predetermined value, and set the close-range view mode if the distance is equal to or shorter than the predetermined value.

8. The information processing apparatus according to claim 1, wherein the first display and the second display are mounted on a head mounted display (HMD).

9. The information processing apparatus according to claim 1, wherein the one or more processors further operate to:

generate a background image in accordance with the first captured image and the second real image; and output, to the first display, if the close-range view mode is set, a synthesized image in which a first background image cut out from the background image and a virtual image are synthesized, and output, to the second display, a synthesized image in which a second background image which is different from the first background image cut out from the background image and a virtual image are synthesized such that the synthesized image of the first background image and the synthesized image of the second background image are displayed, at the same time or contemporaneously, on the first display and on the second display, respectively.

10. An information processing method, comprising:

acquiring a first real image captured by a first image capturing device from a first viewpoint which is far from a real object by a first distance and a second real image captured by a second image capturing device from a second viewpoint different from the first viewpoint and far from the real object by a second distance which is longer than the first distance such that the first real image and the second real image are different;

setting a distant view mode, and, when the distant view mode is set, outputting a first synthesized image in which the first real image and a virtual image are synthesized to both a first display for presenting an image to a user's left eye and to a second display for presenting an image to a user's right eye such that the first synthesized image is displayed, at the same time or contemporaneously, on the first display and the second display; and setting a close-range view mode which is different from the distant view mode, and, when the close-range view mode is set, outputting a second synthesized image in which the first real image and the virtual image are synthesized to the first display, and a third synthesized image in which the second real image and the virtual image are synthesized to the second display such that the second synthesized image and the third synthesized image are displayed, at the same time or contemporaneously, on the first display and the second display, respectively.

11. A non-transitory computer-readable storage medium storing a computer program that causes a computer to perform an information processing method, the method comprising:

acquiring a first real image captured by a first image capturing device from a first viewpoint which is far from a real object by a first distance and a second real image captured by a second image capturing device from a second viewpoint different from the first viewpoint and far from the real object by a second distance which is longer than the first distance such that the first real image and the second real image are different;

outputting, if a distant view mode is set, a first synthesized image in which the first real image and a virtual image are synthesized to both a first display for presenting an image to a user's left eye and to a second display for presenting an image to a user's right eye such that the first synthesized image is displayed, at the same time or contemporaneously, on the first display and the second display; and outputting, if a close-range view mode which is different from the distant view mode is set, a second synthesized image in which the first real image and the virtual image are synthesized to the first display, and a third synthesized image in which the second real image and the virtual image are synthesized to the second display such that the second synthesized image and the third synthesized image are displayed, at the same time or contemporaneously, on the first display and the second display, respectively.

* * * * *